United States Patent Office 3,537,978
Patented Nov. 3, 1970

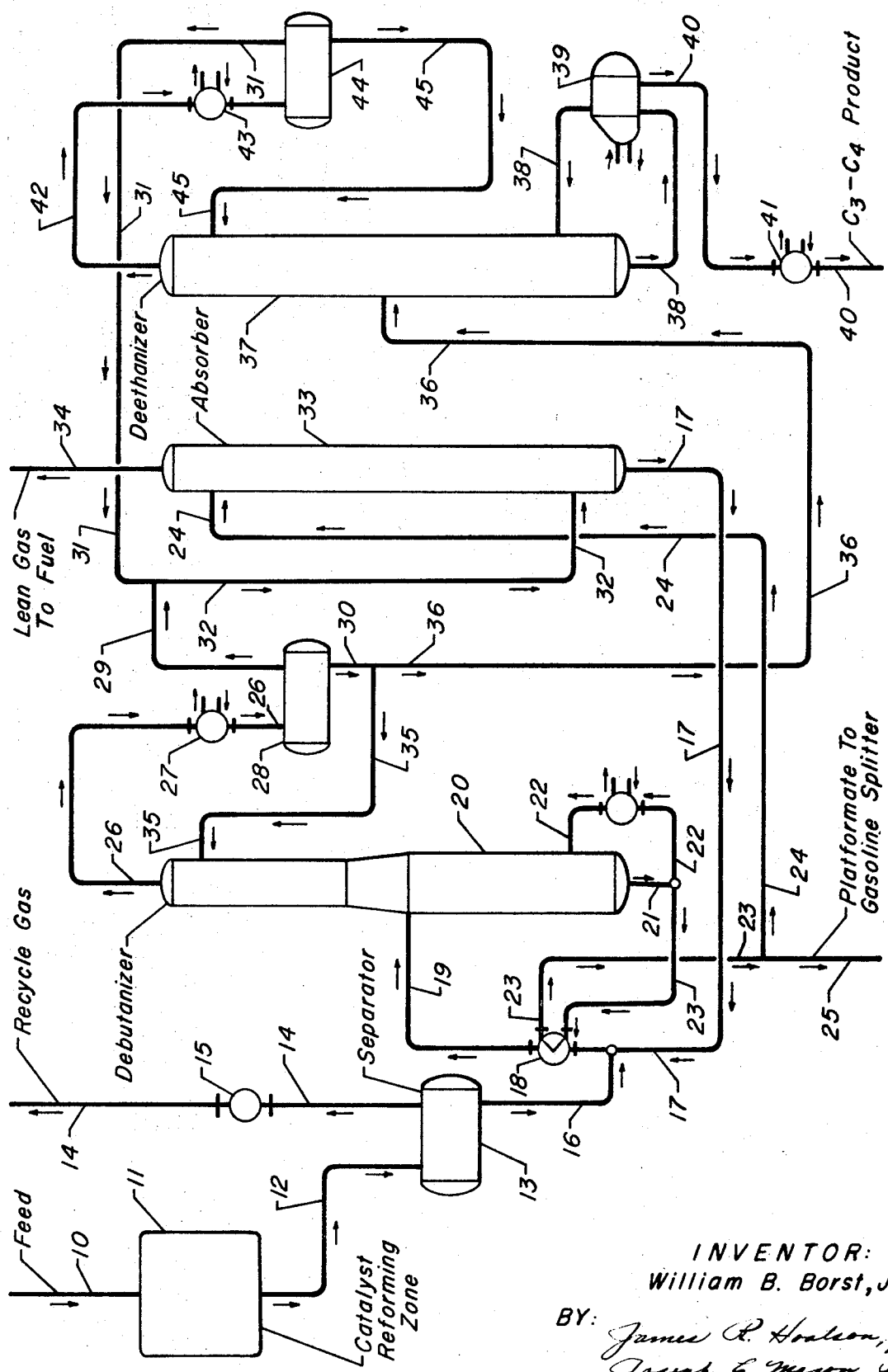

3,537,978
SEPARATION METHOD
William B. Borst, Jr., Mount Prospect, Ill., assignor to Universal Oil Products Company, Des Plaines, Ill., a corporation of Delaware
Filed Dec. 27, 1968, Ser. No. 787,351
Int. Cl. C10g 5/04
U.S. Cl. 208—101     3 Claims

ABSTRACT OF THE DISCLOSURE

Method for separating the effluent from a catalytic reforming zone utilizing absorption and fractionation techniques. The inventive processing scheme permits high recovery of normally gaseous hydrocarbons as well as reformate. The deethanizer gaseous overhead is contacted with the debutanizer bottoms as a lean absorber oil.

BACKGROUND OF THE INVENTION

This invention relates to a method for the conversion of hydrocarbons. It particularly relates to the catalytic reforming of hydrocarbons to produce gasoline boiling range products. It specifically relates to a method for separating the effluent from a catalytic reforming zone via an improved absorption and fractionation technique.

It is well known in the art that high quality gasoline boiling range products, such as aromatic hydrocarbons, e.g. benzene, toluene, and xylene, may be produced by a catalytic reforming process wherein naphtha-containing feedstocks are passed over platinum-containing catalyst in the presence of hydrogen in order to convert at least a portion of the feedstock into aromatic hydrocarbons. One of the predominant reactions in catalytic reforming involves dehydrogenation of naphthenic hydrocarbons. The dehydrogenation function produces a net excess of hydrogen from the process which is available for other uses, such as hydrodesulfurization reactions, and the like. A considerable portion of the produced hydrogen, however, is required for recycle purposes in order that a proper partial pressure of hydrogen may be maintained over the catalyst in the catalytic reforming zone. It follows, therefore, that it is necessary to separate the hydrogen gas from the effluent of a catalytic reforming zone before it can be utilized for such purposes. Normally, this is performed according to prior art schemes by flash separation in a flash chamber subsequent to the catalytic reforming zone.

In addition, the catlytic reforming reaction also involves a hydrocracking function which segments hydrocarbons into relatively low molecular weight hydrocarbons, e.g. normally gaseous hydrocarbons, such as methane, ethane, propane, butane, etc. and, in particular, $C_2+$ hydrocarbons which then become contaminants in the gaseous hydrogen which is separated from the effluent of the reaction zone. However, these normally gaseous hydrocarbons have utility and as such it is desirable to recover them in as high concentration as possible. In particular, the $C_3$ and $C_4$ hydrocarbons are useful as feedstock for the alkylation reaction or the $C_3$ olefins are useful as a feedstock for polymerization to gasoline boiling range materials or solid polymers, commonly known as polypropylene. All of these normally gaseous hydrocarbons are, therefore, separated from the effluent of a catalytic reforming zone by various techniques usually including absorption and fractionation and which produce as a residual material reformate or high quality gasoline boiling range materials.

Other hydrocarbon conversion processes produce normally gaseous hydrocarbons in varying amounts. For example, hydrocracking reactions, catalytic cracking reactions, thermal cracking reactions, and the like, produce commercially desirable quantities of these normally gaseous hydrocarbons. Therefore, it would be desirable to provide a method for separating the effluent from these conversion zones into particular products, such as those individual products from normally gaseous hydrocarbons and a gasoline boiling range product comprising normally liquid hydrocarbons.

SUMMARY OF THE INVENTION

Therefore, it is an object of this invention to provide an improved method for the conversion of hydrocarbons.

It is another object of this invention to provide a method for separating the effluent from a hydrocarbon conversion zone into normally gaseous products and normally liquid products.

It is a still further object of this invention to provide an improved method for the catalyst reforming of hydrocarbons to produce gasoline boiling range products in a facile and economical manner.

Accordingly, the present invention provides a method for separating the effluent from a hydrocarbon conversion zone which comprises: (a) introducing said effluent into a separation zone under conditions sufficient to produce a first gaseous stream comprising non-hydrocarbon components an a first liquid stream contining normally gaseous and normally liquid hydrocarbons; (b) passing said first liquid stream into a first fractionation zone under conditions sufficient to produce a distillate stream comprising normally gaseous hydrocarbons and a bottoms stream comprising normally liquid hydrocarbons; (c) separating said distillate stream into a second gaseous fraction and a second liquid stream; (d) introducing said second gaseous stream into an absorption zone in contact with a hereinafter specified lean absorber oil said absorption zone maintained under conditions sufficient to produce a lean gas first product stream comprising $C_1$ and $C_2$ hydrocarbons, and a rich absorber oil containing absorbed normally gaseous hydrocarbons; (e) passing said rich absorber oil of Step (d) into said first fractionation zone; (f) introducing a portion of said bottoms stream of Step (b) into the absorption zone of Step (d) as the specified lean absorber oil; (g) passing said second liquid stream into a second fractionation zone under conditions sufficient to produce a second product stream comprising $C_3$ and $C_4$ hydrocarbons, and a reject stream containing $C_1$ and $C_2$ hydrocarbons; and, (h) recovering the remainder of said bottoms stream of Step (b) as a third bottoms stream.

Another embodiment of this invention includes the method hereinabove wherein said reject stream of Step (g) is passed into said absorption zone of Step (d) for contact therein with the specified lean absorber oil.

DETAILED DESCRIPTION OF THE INVENTION

The art of catalytic reforming and the broad art of hydrocarbon conversion described hereinabove is generally well known to those skilled in the art and need not be discussed in great detail herein. However, for illustrative purposes, the present invention will be described with reference to the catalytic reforming process, although it is to be understood that the present invention broadly provides a method for separating the effluent from any conversion reaction zone which contains the types of components which are referred to herein as "normally gaseous hydrocarbons" and "normally liquid hydrocarbons."

Therefore, in brief, suitable charge stocks for use in the catalytic reforming operation to produce gasoline boiling range products, such as the previously mentioned aromatic hydrocarbons, are those which contain both naphthenes and paraffins in relatively high concentration.

Such feed-stocks include narrow boiling fractions, such as naphtha fractions, as well as substantially pure materials, such as cyclohexane, methylcyclohexane, mixtures thereof, and the like. The preferred class of suitable feedstocks for the catalytic reforming operation include primarily straight-run gasolines, such as the light and heavy naphtha fractions. It is distinctly preferred to use a naphtha fraction boiling at atmospheric pressure between, say, 90° F. and 450° F. as the feedstock to the catalytic reforming operation.

The preferred types of catalyst for use in the catalytic reforming process are well known to those skilled in the art and typically comprises platinum on an alumina support. These catalysts may contain substantial amounts of platinum, but for economic and quality reasons, the platinum will be typically within the range from 0.5% to 5.0% by weight.

Satisfactory operating conditions for the catalytic reforming operation include the presence of the hereinabove mentioned catalyst and temperatures from about 500° F. to 1050° F., preferably, from about 600° F. to 1000° F., pressures from about 50 p.s.i.g. to about 1200 p.s.i.g., preferably from about 100 p.s.i.g. to 300 p.s.i.g., a liquid hourly space velocity from within the range from about 0.2 to 40, and the presence of a hydrogen-containing gas equivalent to a hydrogen-to-hydrocarbon mol ratio of about 0.5 to 15.0.

In many operations involving the conversion of hydrocarbons there is a solid particulate catalyst utilized. Conventionally, the catalytic mass may be contained in a fixed bed or series of fixed beds, may be moved as in a moving bed operation, or may be fluidized by techniques well known to those skilled in the art. Similarly, the catalytic reforming operation is carried out in a fixed bed configuration. Usually, a plurality of catalyst beds are also used either in stacked fashion within a single reactor shell or more preferably in separate ractors. A single reactor with a single catalyst bed may be utilized, but preferably for catalytic reforming, a plurality of catalyst beds are used. Still more preferably, in the conversion practice of this invention, from 2 to 5 catalyst beds maintained in separate reactor vessels are utilized. As, for example, 4 separate reactor beds are used to illustrate the preferred embodiment of this invention.

The amount of catalyst used in each reactor bed may be varied considerably depending upon the characteristics of the feedstock and the purpose for which the conversion reaction is carried out. In catalytic reforming, for example, the catalyst may be disposed in separate reactors in the following manner: 10%, 15%, 25%, and 50% by weight, respectively. Other variations of reactor geometry and catalyst volume will be evident to those skilled in the art from general knowledge and the specific teachings presented herein.

In practice, the present invention passes the total effluent obtained, for example, from a catalytic reforming zone into a high pressure separation zone. As those skilled in the art are aware, the separation zone immediately following the reaction zone of a catalytic reforming process unit is maintained essentially at the same pressure as the reaction zone itself. The function of the high pressure separation zone is to separate non-hydrocarbon components, such as hydrogen, from the hydrocarbon effluent which contains the desired products produced in the hydrocarbon conversion zone. According to the present invention it is a requirement that the effluent stream be introduced into such a separation zone in order to provide a separation between the non-hydrocarbon components and the hydrocarbon components. For the example of separating the effluent from a catalytic reforming zone, the non-hydrocarbon component will be primarily hydrogen, although in some cases, it may be the acid gases, such as $H_2S$ and $CO_2$.

The hydrocarbon component of the reaction zone effluent is passed into a debutanizer column which is maintained under conditions sufficient to produce an overhead distillate stream comprising a concentrate of normally gaseous hydrocarbons plus residual hydrogen, if any. The bottoms material from the debutanizer column contains essentially all of the desired normally gaseous hydrocarbons and is withdrawn from the system as a separate product stream.

The overhead from the debutanizer column is now separated into an additional gaseous stream comprising primarily $C_1$ and $C_2$ hydrocarbons, although this flashed or separated gaseous stream may also contain significant amounts of $C_3$ and $C_4$ hydrocarbons, and a liquid stream which comprises a concentrate of $C_3$ and $C_4$ hydrocarbons together with smaller quantities of $C_5$ hydrocarbons. The gaseous stream which has been separated from the overhead of the debutanizer column is passed into an absorber column in countercurrent contact, preferably, with a hereinafter specified lean absorber oil. According to the practice of this invention, the lean absorber oil is a portion of the bottoms product from the debutanizer column. The operating conditions in the absorber column are sufficient to produce a lean gas stream comprising essentially residual hydrogen, $C_1$ and $C_2$ hydrocarbons and is uniquely suitable for use as fuel. The rich absorber oil containing dissolved normally gaseous hydrocarbons is introduced into the debutanizer column as additional feed thereto, preferably, in admixture with the total hydrocarbon liquid stream also bein introduced into the debutanizer column from the high pressure separation zone.

The separated liquid material which had been obtained from the overhead of the debutanizer column is introduced into a deethanizer column maintained under conditions sufficient to produce an overhead stream which is a concentrate of $C_1$ and $C_2$ hydrocarbons and a bottoms stream which is a concentrate of essentially all of the $C_3$ and $C_4$ hydrocarbons which had originally been present in the effluent from the catalytic reforming zone. In a particular embodiment of this invention the overhead of the deethanizer column is returned to the absorber column in admixture with the gaseous feed thereto which had been obtained from the overhead of the debutanizer column.

By operating in the manner disclosed herein, it was found that unusually high recovery of $C_3$ and $C_4$ hydrocarbon products could be obtained as well as the desired normally gaseous hydrocarbons, e.g. reformate, which had been produced in the catalytic reforming zone.

The invention may be more fully understood with reference to the appended drawing which is a schematic representation of apparatus for practicing one embodiment of the present invention.

DESCRIPTION OF THE DRAWING

A petroleum-derived naphtha fraction is introduced via line 10 into catalytic reforming zone 11 which contains a platinum catalyst and which is operated under conventional reforming conditions previously mentioned. To illustrate the mechanics of this invention, however, the operating pressure of catalytic reforming zone 11 is chosen to be about 300 p.s.i.g. at the inlet to the catalytic reactors. The total effluent from the catalytic reforming zone 11 is withdrawn via line 12, cooled by means of coolers, not shown, and passed into high pressure separation zone 13 at a pressure of about 280 p.s.i.g. The operating conditions maintained in separation zone 13 are not critical it only being important that sufficient conditions be maintained therein in order to produce a gaseous stream comprising non-hydrocarbon components, such as hydrogen, and a liquid stream containing normally gaseous and normally liquid hydrocarbons.

The pressure in separation zone 13 is deemed to be substantially that maintained in reaction zone 11, although it is actually at a lower than reaction pressure due to the pressure drop through the system. Sufficient separation means, including residence time, is imposed on zone 13 so that a relatively pure hydrogen stream is separated via line 14, compressed via compressor 15, and preferably returned by means not shown to catalytic reforming zone 11. Since catalytic reforming has a significant dehydrogenation function, there is also produced a net hydrogen gas stream which may be utilized in other hydrogenation processes and which is withdrawn from the system by means not shown. The conditions imposed on zone 13 are also sufficient to produce a liquid product stream which may be utilized in other hydrogenation processes and which is withdrawn from the system by means not shown. The conditions imposed on zone 13 are also sufficient to produce a liquid product stream which is separated and removed via line 16. The material in line 16 contains the reformed hydrocarbons, to wit: gasoline boiling range hydrocarbons, such as benzene, toluene, and xylene, together with significant amounts of normally gaseous hydrocarbons, including $C_1$, $C_2$, $C_3$, $C_4$, and $C_5$ hydrocarbons.

The separated liquid material in line 16 is preferably admixed with rich absorber oil from a source hereinafter specified, heated in heater 18 by indirect heat exchange with the bottoms from the debutanizer column, more fully discussed hereinafter, and passed as an admixture via line 19 into debutanizer column 20. For illustrative purposes, debutanizer column 20 is maintained under an operating temperature of about 162° F. at the top of the column and 460° F. at the bottom of the column. The pressure maintained in debutanizer column 20 is substantially the same as the pressure maintained in separation zone 13, allowing for normal pressure drop through the system. Accordingly, the top of the debutanizer column may be about 280 p.s.i.g. and the bottom of the column about 290 p.s.i.g. These operating conditions are sufficient to produce a normally liquid hydrocarbon stream containing the desired reformate or aromatic concentrate fraction which is mithdrawn from column 20 via line 21. A portion of the bottoms material from column 20 is passed through reboiler circuit 22 and returned to the column in a manner sufficient to provide heat for fractionation therein. The remaining amount of bottoms material is passed via line 23 into heat exchanger 18 and a net product of normally liquid hydrocarbons is withdrawn from the system via line 25.

There is produced from debutanizer column 20 a gaseous overhead fraction which is withdrawn via line 26, cooled and at least partially condensed in condenser 27, and collected in receiver 28. The conditions maintained in receiver 28 are sufficient to separate the overhead material from column 20 into a gaseous fraction which is withdrawn via line 29 and a liquid fraction which is withdrawn via line 30. The separated gaseous fraction contains a concentrate of $C_1$ and $C_2$ hydrocarbons together with small quantities of $C_3$ and $C_4$ hydrocarbons. The material in line 29 is admixed with additional gaseous material in line 31 from a source more fully developed hereinafter, and the admixture passed via line 32 into the bottom of absorber column 33. Lean absorber oil which is a portion of the bottoms material from column 20 may be cooled in exchangers not shown and introduced into absorber 33 via line 24.

Satisfactory operating conditions for absorber 33 include an average temperature of from about 90 F. to 150° F. and typically about 120° F. The gaseous components pass upwardly through plural contacting stages and are scrubbed by the downward flowing lean absorber oil. This operation, including operating conditions are sufficient to produce a lean gas comprising a concentrate of $C_1$ and $C_2$ hydrocarbons which is withdrawn from absorber 33 via line 34 and utilized preferably as fuel. The rich absorber oil containing dissolved or absorbed normally gaseous hydrocarbons is withdrawn from absorber 33 via line 17 and passed into debutanizer column 20 in the manner previously mentioned.

Returning now to the receiver-separator 28: the collected liquid material which is withdrawn via line 30 is passed in part via line 35 as reflux into the upper portion of debutanizer column 20. The remainder of the liquid material in line 30 is passed via line 36 into deethanizer column 37 which is maintained under conditions sufficient to produce a gaseous overhead fraction containing the lighter of the normally gaseous hydrocarbons and a liquid bottoms material comprising primarily $C_3$ and $C_4$ hydrocarbons which is withdrawn from column 37 via line 38. The gaseous material in line 42 is condensed in condenser 43 ad passed into receiver 44. The non-condensables, including $C_1$, $C_2$, and $C_3$ hydrocarbons, are withdrawn from receiver 44 via line 31 and passed into absorber 33 in admixture with the material from line 29 in the manner previously mentioned. Receiver 44 is maintained under equilibrium conditions so that the liquid components which are present under the conditions of temperature and pressure maintained therein is withdrawn from receiver 44 via line 45 and utilized as reflux in the upper portion of deethanizer column 37.

The bottoms material from deethanizer column 37 is passed via line 38 into reboiler 39 which creates sufficient vapors for return to column 37 as the heat source for fractionation therein. The residual liquid material is withdrawn from reboiler 39 via line 40, cooled in cooler 41, and passed out to storage as desired product stream comprising $C_3$ and $C_4$ hydrocarbons.

Typical operating conditions for deethanizer column 37 include a top operating temperature of about 123° F. and a bottom operating temperature of about 210° F. The operating pressure for column 37 may range from 500 to 525 p.s.i.g.

The following example is furnished to demonstrate some of the benefits to be achieved by the practice of the present invention.

EXAMPLE

A commercial scale catalytic reforming plant was designed to process a naphtha feedstock. The following data illustrates the composition of the various streams which may be separated in accordance with the present invention. Except as otherwise indicated, all numbers shown are in mols per hour and reference should be made to the appended drawing for applicable line numbers and reference made to the hereinabove description for applicable operation conditions.

| Component | Line No. | | | | | | | | | | | |
|---|---|---|---|---|---|---|---|---|---|---|---|---|
|  | 16 | 17 | 19 | 29 | 36 | 23 | 24 | 25 | 31 | 40 | 32 | 34 |
| $H_2$ | 16.39 | 0.24 | 16.63 | 15.76 | 0.87 |  |  | 0.87 |  | 16.63 | 16.39 |
| $C_1$ | 29.13 | 2.95 | 32.08 | 25.10 | 6.98 |  |  | 6.98 |  | 32.08 | 29.13 |
| $C_2$ | 87.46 | 57.42 | 144.88 | 66.49 | 78.39 |  |  | 77.80 | 0.59 | 144.29 | 86.87 |
| $C_3$ | 146.11 | 86.24 | 232.35 | 58.99 | 173.36 |  |  | 34.56 | 138.80 | 93.55 | 7.31 |
| $iC_4$ | 62.19 | 10.45 | 72.64 | 10.23 | 58.78 | 3.63 | 0.45 | 3.18 | 58.78 | 10.23 | 0.23 |
| $nC_4$ | 98.00 | 12.46 | 110.46 | 11.87 | 90.87 | 7.72 | 0.96 | 6.76 | 90.87 | 11.87 | 0.37 |
| $iC_5$ | 82.99 | 9.16 | 92.15 | 0.18 | 2.75 | 89.22 | 11.11 | 78.11 | 2.75 | 0.18 | 2.13 |
| $nC_5$ | 56.13 | 6.56 | 62.69 | 0.05 | 0.93 | 61.71 | 7.69 | 54.02 | 0.93 | 0.05 | 1.18 |
| $C_6+$ | 865.10 | 120.59 | 985.69 |  |  | 985.69 | 122.76 | 862.93 |  |  | 2.17 |
| Total | 1,443.50 | 306.07 | 1,749.57 | 188.67 | 412.93 | 1,147.97 | 142.97 | 1,005.00 | 120.21 | 292.72 | 308.88 | 145.78 |

PREFERRED EMBODIMENT

Therefore, from the detailed description presented hereinabove, the preferred embodiment of this invention provides a method for separating the effluent from a catalytic reforming zone which comprises: (a) introducing said effluent into a high pressure flash zone under conditions sufficient to produce a first gaseous product stream comprising hydrogen, and a first liquid stream containing normally gaseous and normally liquid hydrocarbon conversion products; (b) passing said first liquid stream into a first fractionation zone under conditions sufficient to produce a distillate stream comprising normally gaseous hydrocarbons, and a bottoms stream comprising normally liquid hydrocarbon conversion products; (c) separating said distillate stream into a second gaseous stream comprising a concentrate of $C_1$ to $C_3$ hydrocarbons, and a second liquid stream comprising a concentrate of $C_3$ and $C_4$ hydrocarbons; (d) introducing said second gaseous stream into an absorption zone in contact with a hereinafter specified lean absorber oil, said absorption zone maintained under conditions sufficient to produce a lean gas second product stream comprising $C_1$ and $C_2$ hydrocarbons, and a rich absorber oil containing absorbed normally gaseous hydrocarbons; (e) passing said rich absorber oil into said first fractionation zone in admixture with said first liquid stream; (f) introducing a portion of said bottoms stream of Step (b) into said absorption zone as the specified absorber oil; (g) passing said second liquid stream of Step (c) into a second fractionation zone under conditions sufficient to produce a third product stream comprising $C_3$ and $C_4$ hydrocarbons, and a distillate fraction containing $C_1$ to $C_3$ hydrocarbons; (h) passing said distillate fraction of Step (g) into said absorption zone in admixture with said second gaseous stream; and, (i) recovering the remainder of said bottoms stream of Step (b) as a fourth product stream.

The invention claimed:

1. Method for separating the effluent from a hydrocarbon conversion zone which comprises:
    (a) introducing said effluent into a separation zone under conditions sufficient to produce a first gaseous stream comprising non-hydrocarbon components, and a first liquid stream containing normally gaseous and normally liquid hydrocarbons;
    (b) passing said first liquid stream into a first fractionation zone under conditions sufficient to produce a distillate stream comprising normally gaseous hydrocarbons, and a bottoms stream comprising normally liquid hydrocarbons;
    (c) separating said distillate stream into a second gaseous stream and a second liquid stream;
    (d) introducing said second gaseous stream into an absorption zone in contact with a hereinafter specified lean absorber oil, said absorption zone maintained under conditions sufficient to produce a lean gas first product stream comprising $C_1$ and $C_2$ hydrocarbons, and a rich absorber oil containing absorbed normally gaseous hydrocarbons;
    (e) passing said rich absorber oil of Step (d) into said first fractionation zone;
    (f) introducing a portion of said bottoms stream of Step (b) into the absorption zone of Step (d) as the specified lean absorber oil;
    (g) passing said second liquid stream into a second fractionation zone under conditions sufficient to produce a second product stream comprising $C_3$ and $C_4$ hydrocarbons, and a reject stream containing $C_1$ and $C_2$ hydrocarbons; and,
    (h) recovering the remainder of said bottoms stream of Step (b) as a third product stream.

2. Method according to claim 1 wherein said reject stream of Step (g) is passed into said absorption zone of Step (d) for contact therein with said specified lean absorber oil.

3. Method for separating the effluent from a catalytic reforming zone which comprises:
    (a) introducing said effluent into a high pressure flash zone under conditions sufficent to produce a first gaseous product stream comprising hydrogen, and a first liquid stream containing normally gaseous and normally liquid hydrocarbon conversion products;
    (b) passing said first liquid stream into a first fractionation zone under conditions sufficient to produce a distillate stream comprising normally gaseous hydrocarbons, and a bottoms stream comprising normally liquid hydrocarbon conversion products;
    (c) separating said distillate stream into a second gaseous stream comprising a concentrate of $C_1$ to $C_3$ hydrocarbons, and a second liquid stream comprising a concentrate of $C_3$ and $C_4$ hydrocarbons;
    (d) introducing said second gaseous stream into an absorption zone in contact with a hereinafter specified lean absorber oil, said absorption zone maintained under conditions sufficient to produce a lean gas second product stream comprising $C_1$ and $C_2$ hydrocarbons, and a rich absorber oil containing absorbed normally gaseous hydrocarbons;
    (e) passing said rich absorber oil into said first fractionation zone in admixture with said first liquid stream;
    (f) introducing a portion of said bottoms stream of Step (b) into said absorption zone as the specified absorber oil;
    (g) passing said second liquid stream of Step (c) into a second fractionation zone under conditions sufficient to produce a third product stream comprising $C_3$ and $C_4$ hydrocarbons, and a distillate fraction containing $C_1$ to $C_3$ hydrocarbons;
    (h) passing said distillate fraction of Step (g) into said absorption zone in admixture with said second gaseous stream; and,
    (i) recovering the remainder of said bottoms stream of Step (b) as a fourth product stream.

References Cited

UNITED STATES PATENTS

| | | | |
|---|---|---|---|
| 2,900,326 | 8/1959 | Gilmore | 208—101 |
| 2,929,773 | 3/1960 | Smith et al. | 208—101 |
| 2,939,834 | 6/1960 | Evans | 208—101 |
| 2,985,583 | 5/1961 | Gilmore | 208—101 |
| 3,122,496 | 2/1964 | Harper | 208—341 |
| 3,425,931 | 2/1969 | Penisten et al. | 208—101 |
| 3,470,084 | 9/1969 | Scott | 208—341 |

HERBERT LEVINE, Primary Examiner

U.S. Cl. X.R.

208—341